(12) United States Patent
Yashiro

(10) Patent No.: US 7,127,452 B1
(45) Date of Patent: Oct. 24, 2006

(54) IMAGE SEARCH APPARATUS, IMAGE SEARCH METHOD AND STORAGE MEDIUM

(75) Inventor: Satoshi Yashiro, Ohta-ku (JP)

(73) Assignee: Canon Kabushiki Kaisha (JP)

( * ) Notice: Subject to any disclaimer, the term of this patent is extended or adjusted under 35 U.S.C. 154(b) by 194 days.

(21) Appl. No.: 09/651,654

(22) Filed: Aug. 30, 2000

(30) Foreign Application Priority Data

Aug. 31, 1999 (JP) ................................. 11-245722

(51) Int. Cl.
*G06F 17/30* (2006.01)
(52) U.S. Cl. .......................................... 707/3; 707/102
(58) Field of Classification Search .............. 707/1–10, 707/100–104.1, 200–205; 382/306, 305; 342/354.12; 715/525
See application file for complete search history.

(56) References Cited

U.S. PATENT DOCUMENTS

| | | | | |
|---|---|---|---|---|
| 5,038,379 A | * | 8/1991 | Sano | 382/306 |
| 6,415,307 B1 | * | 7/2002 | Jones et al. | 715/525 |
| 6,463,426 B1 | * | 10/2002 | Lipson et al. | 707/3 |
| 6,480,843 B1 | * | 11/2002 | Li | 707/5 |
| 6,584,223 B1 | * | 6/2003 | Shiiyama | 382/173 |
| 6,718,075 B1 | * | 4/2004 | Yamamoto | 382/305 |
| 2002/0047798 A1 | * | 4/2002 | Platt | 342/357.12 |

FOREIGN PATENT DOCUMENTS

| | | |
|---|---|---|
| JP | 09-114853 A | 5/1997 |
| JP | 11-212987 A | 8/1999 |

* cited by examiner

*Primary Examiner*—Mohammad Ali
(74) *Attorney, Agent, or Firm*—Rossi, Kimms & McDowell LLP

(57) ABSTRACT

There are provided an image search apparatus, and an image search method, which make it easier for a user to reach an image desired to be searched, by rearranging images to which keywords matching an inputted search term are assigned, according to the importance of the keywords to the image desired to be searched, and a storage medium storing a program for executing the image control and search method. Keywords corresponding to images to be searched are searched for according to the inputted search terms, and images corresponding to the keywords searched are rearranged according to importance set for the keywords. The images are stored together with the keywords for which the importance has thus been determined. The images to which the keywords matching the inputted search term are rearranged in the order of the importance.

16 Claims, 15 Drawing Sheets

FIG.4

| IMAGE INFORMATION TABLE ||
|---|---|
| IMAGE ID | PATH INFORMATION |
| 1 | image1.jpg |
| 2 | image2.jpg |
| 3 | image3.jpg |
| 4 | image4.jpg |
| 5 | image5.jpg |
| 6 | image6.jpg |
| 7 | image7.jpg |

FIG.5

KEYWORD TABLE

| IMAGE ID | KEYWORD | IMPORTANCE |
|---|---|---|
| 1 | APPLE | 3 |
| 1 | FRUIT | 2 |
| 1 | SWEET | 1 |
| 1 | TOMATO | 3 |
| 1 | VEGETABLE | 2 |
| 2 | HEAP | 1 |
| 2 | COOKIE | 3 |
| 2 | CAN | 2 |
| 2 | CONFECTIONERY | 3 |
| 3 | MOTORBIKE | 3 |
| 3 | MOTORCYCLE | 3 |
| 3 | HELMET | 2 |
| 3 | OFF-ROAD | 1 |
| 4 | MOTORCYCLE | 2 |
| 4 | RACE | 2 |
| 4 | GAME | 1 |
| 5 | MOTORCYCLE | |
| 5 | RACE | |
| 5 | GAME | |
| ... | ... | ... |

FIG.6

SEARCH RESULT OF "MOTORCYCLE"

| IMAGE ID | KEYWORD | IMPORTANCE |
|---|---|---|
| 3 | MOTORCYCLE | 3 |
| 4 | MOTORCYCLE | 2 |
| 5 | MOTORCYCLE | |

FIG.7

| IMAGE ID | KEYWORD | IMPORTANCE | PRIORITY |
|---|---|---|---|
| 3 | MOTORCYCLE | 3 | 3 |
| 4 | MOTORCYCLE | 2 | 2 |
| 5 | MOTORCYCLE | | 2 |

FIG.10

| IMAGE INFORMATION TABLE ||
| --- | --- |
| IMAGE ID | PATH INFORMATION |
| 1 | image1.jpg |
| 2 | image2.jpg |
| 3 | image3.jpg |
| 4 | image4.jpg |
| 5 | image5.jpg |
| 6 | image6.jpg |
| 7 | image7.jpg |

FIG.11

KEYWORD TABLE

| IMAGE ID | KEYWORD | IMPORTANCE |
|---|---|---|
| 1 | APPLE | 3 |
| 1 | FRUIT | 2 |
| 1 | SWEET | 1 |
| 1 | TOMATO | 3 |
| 1 | VEGETABLE | 2 |
| 2 | HEAP | 1 |
| 2 | COOKIE | 3 |
| 2 | CAN | 2 |
| 2 | CONFECTIONERY | 3 |
| 3 | MOTORBIKE | 3 |
| 3 | MOTORCYCLE | 3 |
| 3 | HELMET | 2 |
| 3 | OFF-ROAD | 1 |
| 4 | MOTORCYCLE | 2 |
| 4 | RACE | 2 |
| 4 | GAME | 1 |
| ... | ... | ... |

FIG.12

| SYNONYM | SEARCH TERM | ACCORDANCE |
|---|---|---|
| MOTORCYCLE | MOTORBIKE | 0.6 |
| MOTORCYCLE | MOTOR BICYCLE | 0.8 |
| MOTORCYCLE | AUTOBICYCLE | 0.8 |
| APPLE (IN HIRAGANA) | APPLE (IN KATAKANA) | 0.99 |
| APPLE (IN HIRAGANA) | APPLE (IN KANJI) | 0.99 |
| APPLE (IN HIRAGANA) | APPLE (IN KATAKANA) | 0.9 |

FIG.13

SEARCH RESULT

| IMAGE ID | KEYWORD | IMPORTANCE |
|---|---|---|
| 3 | MOTORBIKE | 3 |
| 3 | MOTORCYCLE | 3 |
| 4 | MOTORCYCLE | 2 |

FIG.14

| PRIORITY FORMULA MATRIX | 0~0.5 | 0.5~1 |
|---|---|---|
| ACCORDANCE / IMPORTANCE 1 | ACCORDANCE | IMPORTANCE+ACCORDANCE |
| 2 | ACCORDANCE | IMPORTANCE+ACCORDANCE |
| 3 | ACCORDANCE | IMPORTANCE+ACCORDANCE |
| NONE | ACCORDANCE | ACCORDANCE |

| SEARCH RESULT | | | |
|---|---|---|---|
| IMAGE ID | KEYWORD | IMPORTANCE | PRIORITY |
| 3 | MOTORCYCLE | 2 | 4 |
| 4 | MOTORCYCLE | 2 | 3 |

IMAGE SEARCH APPARATUS, IMAGE SEARCH METHOD AND STORAGE MEDIUM

BACKGROUND OF THE INVENTION

1. Field of the Invention

The present invention relates generally to an image search apparatus, an image search method and a storage medium, and more particularly to an image search apparatus, and an image search method that are suitable for managing and searching images by assigning keywords representing the images, and a storage medium storing a program for executing the image control and search method.

2. Description of Related Art

There is a conventional image database management technique of storing image data in a database and searching the stored image data. In the conventional image database management, keywords are assigned to images, and desired images can be searched for depending on the accordance of the keywords with search terms. According to an image searching process using this technique, even if a search term inputted by an operator does not completely match a keyword, the search term is made to match the keyword by replacing the search term with a term similar to the search term in notation, a synonym and a narrower term. This reduces the possibility that the image is not searched out due to the discord between the keyword and the search term.

The above conventional technique, however, has a problem as described below. In the conventional image database management, it is almost impossible for all images to be represented by keywords. Some keywords represent predominant objects in images, and some keywords represent minor objects that appear in images but do not form subjects of the images. If the images are searched for by the keywords in such image management system, all the images to which a keyword matching the inputted search term is assigned are searched out. More specifically, an image whose subject is the keyword and an image which appears as a small image at the edge of an image are searched out. Therefore, it takes a long time for a searcher to reach a desired image.

SUMMARY OF THE INVENTION

It is an object of the present invention to provide an image search apparatus, and an image search method which make it easier for a user to reach an image desired to be searched, by rearranging images to which keywords matching an inputted search term are assigned, according to the importance of the keywords to the image desired to be searched, and a storage medium storing a program for executing the image control and search method To attain the above object, according to a first aspect of the present invention, there is provided an image search apparatus, which searches image data according to keywords assigned to the image data, the image search apparatus comprising input means for inputting search terms, storage means storing the keywords assigned to the image data correspondingly to importance, search means for searching the storage means for keywords corresponding to images to be searched according to the search terms inputted by the input means, and rearranging means for rearranging images corresponding to the keywords searched by the search means according to the importance.

Preferably, in the image search apparatus according to the first aspect, when the rearranging means rearranges the images corresponding to the keywords searched by the search means according to the importance, the rearranging means regards standard importance of a default as priority in a case where the importance is not stored in the storage means, and the rearranging means regards the importance as priority in a case where the importance is stored in the storage means, degree of the importance being determined according to whether or not the searched keywords represent subjects of images.

To attain the above object, according to the second aspect of the present invention, there is also provided an image search method applied to an image search apparatus, which searches image data according to keywords assigned to the image data, the image search method comprising an input step of inputting search terms, a storage controlling step of storing, in storage means, the keywords assigned to the image data correspondingly to importance, a searching step of searching the storage means for keywords corresponding to images to be searched according to the search terms inputted by the input steps, and a rearranging step of rearranging images corresponding to the keywords searched by the searching step according to the importance.

Preferably, in the image search method according to the first aspect, when the images corresponding to the keywords searched by the search means are rearranged according to the importance, the rearranging step comprises regarding standard importance of a default as priority in a case where the importance is not stored in the storage means, and regarding the importance as priority in a case where the importance is stored in the storage means, degree of the importance being determined according to whether or not the searched keywords represent subjects of images.

To attain the above object, according to the second aspect of the present invention, there is also provided a storage medium that can be read by a computer and stores a program for executing an image search method applied to an image search apparatus, which searches image data according to keywords assigned to the image data, the image search method comprising an input step of inputting search terms, a storage controlling step of storing, in storage means, the keywords assigned to the image data correspondingly to importance, a searching step of searching the storage means for keywords corresponding to images to be searched according to the search terms inputted by the input step, and a rearranging step of rearranging images corresponding to the keywords searched by the searching step according to the importance.

To attain the above object, according to a second aspect of the present invention, there is provided an image search apparatus, which searches image data according to keywords assigned to the image data, the image search apparatus comprising input means for inputting search terms, storage means storing the keywords assigned to the image data correspondingly to importance, search means for searching the storage means for keywords corresponding to images to be searched or keywords closely related in meaning to the images to be searched according to the search terms inputted by the input means, and rearranging means for rearranging images corresponding to the keywords searched by the search means according to the importance and closeness in meaning of the closely related keywords.

Preferably, in the image search apparatus according to the second aspect, when the rearranging means rearranges the images corresponding to the keywords searched by the search means according to the importance and the closeness in meaning, the rearranging means calculates priority with reference to a relevant column of accordance in a line with no importance in a preset priority formula matrix in a case where the importance is not stored in the storage means; and the rearranging means calculates priority with reference to a relevant column of accordance in a line with relevant importance in the priority formula matrix in a case where the importance is stored in the storage means, degree of the importance being determined according to whether or not the searched keywords represent subjects of images.

More preferably, in the image search apparatus according to the second aspect, the priority formula matrix is constructed in a manner such that the importance and the accordance are arranged correspondingly to one other in a form of a matrix, the rearranging means regarding the importance plus the accordance as priority if the accordance is not less than a predetermined threshold level, and regarding the accordance as priority if the accordance is less than the threshold level.

To attain the above object, according to the second aspect of the present invention, there is also provided an image search method applied to an image search apparatus, which searches image data according to keywords assigned to the image data, the image search method comprising an input step of inputting search terms, a storage controlling step of storing, in storage means, the keywords assigned to the image data correspondingly to importance, a searching step of searching the storage means for keywords corresponding to the images to be searched or keywords closely related in meaning to the images to be searched according to the search terms inputted by the input step, and a rearranging step of rearranging images corresponding to the keywords searched by the searching step according to the importance and closeness in meaning of the closely related keywords.

Preferably, in the image search method according to the second aspect, when the images corresponding to the keywords searched by the searching step are rearranged according to the importance and the closeness in meaning, the rearranging step comprises calculating priority with reference to a relevant column of accordance in a line with no importance in a preset priority formula matrix in a case where the importance is not stored in the storage means, and calculating priority with reference to a relevant column of accordance in a line with relevant importance in the priority formula matrix in a case where the importance is stored in the storage means, degree of the importance being determined according to whether or not the searched keywords represent subjects of images.

More preferably, in the image search method according to the second aspect, the priority formula matrix is constructed in a manner such that the importance and the accordance are arranged correspondingly to one other in a form of a matrix, the rearranging step comprising regarding the importance plus the accordance as priority if the accordance is not less than a predetermined threshold level, and regarding the accordance as priority if the accordance is less than said threshold level.

To attain the above object, according to the second aspect of the present invention, there is provided a storage medium that can be read by a computer and stores a program for executing an image search method applied to an image search apparatus, which searches image data according to keywords assigned to the image data, the image search method comprising an input step of inputting search terms, a storage controlling step of storing, in storage means, the keywords assigned to the image data correspondingly to importance, a searching step of searching the storage means for keywords corresponding to images to be searched or keywords closely related in meaning to the images to be searched according to the search terms inputted by the input step, and a rearranging step of rearranging images corresponding to the keywords searched by the searching step according to the importance and closeness in meaning of the closely related keywords.

In a preferred application of the present invention, the image search apparatus according to the first and second aspects is provided in a server of an information retrieval system on the Internet, the input means receiving search terms inputted by a client of the information retrieval system on the Internet, the search means searching the storage means for keywords corresponding to images to be searched according to the received search terms, the rearranging means rearranging images corresponding to keywords searched by the search means according to the importance, and the image search apparatus returning the rearranged images in a predetermined format such as HTML and XML to the client.

In a preferred application of the present invention, in the image search method according to the first and second aspects, the input step comprises receiving search terms inputted by a client of an information retrieval system on the Internet, the searching step comprising searching the storage means for keywords corresponding to images to be searched according to the received search terms, the rearranging step comprising rearranging images corresponding to keywords searched by the searching step according to the importance, and the rearranged images being returned in a predetermined format such as HTML and XML to the client.

According to the image search apparatus, the image search method, and the storage medium of the first aspect of the present invention, keywords corresponding to images to be searched are searched for according to the inputted search terms, and images corresponding to the keywords searched are rearranged according to importance set for the keywords. More specifically, keywords representing objects forming subjects of images are determined to have much importance, and unimportant keywords representing minor objects in images, which do not form subjects of the images, are determined to have little importance. The images are stored together with the keywords for which the importance has been determined as mentioned above. The images to which the keywords matching the inputted search term are rearranged in the order of the importance. This makes it easy for the user to quickly reach a desired image.

According to the image search apparatus, the image search method, and the storage medium of the second aspect of the present invention, keywords corresponding to images to be searched or keywords closely related in meaning to the images to be searched are searched for according to the inputted search terms, and images corresponding to the keywords searched are rearranged according to importance set for the keywords and closeness in meaning of the closely related keywords. More specifically, keywords representing objects forming subjects of images are determined to have much importance, and unimportant keywords representing minor objects in images, which do not form subjects of the images, are determined to have little importance. Accordance (closeness in meaning) is determined according to the similarity of a keyword, which matches an inputted search term, with respect to the search term. The images are stored together with the keywords for which the importance and the accordance have been determined as mentioned above. The images to which the keywords matching the inputted search term are rearranged in the order of the importance and the accordance. This makes it easy for the user to quickly reach a desired image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a view showing a part of a table of image management information stored in a secondary storage device in FIG. 1 according to the first embodiment;

FIG. 5 is a view showing a part of the table of image management information stored in the secondary storage device;

FIG. 6 is a view of data on results of processing according to the procedure of FIG. 2;

FIG. 7 is a view of data on results of processing according to the procedure of FIG. 2;

FIG. 10 is a view showing a part of a table of image management information stored in a secondary storage device in FIG. 1 according to the second embodiment;

FIG. 11 is a view showing a part of the table of image management information stored in the secondary storage device;

FIG. 12 is a view showing a part of the table of image management information stored in the secondary storage device;

FIG. 13 is a view of data on results of processing according to the procedure of FIG. 8;

FIG. 14 is a view of data on results of processing according to the procedure of FIG. 9;

DETAILED DESCRIPTION OF THE PREFERRED EMBODIMENTS

Preferred embodiments of the present invention will be described hereinbelow with reference to the accompanying drawings.

Figure 1:
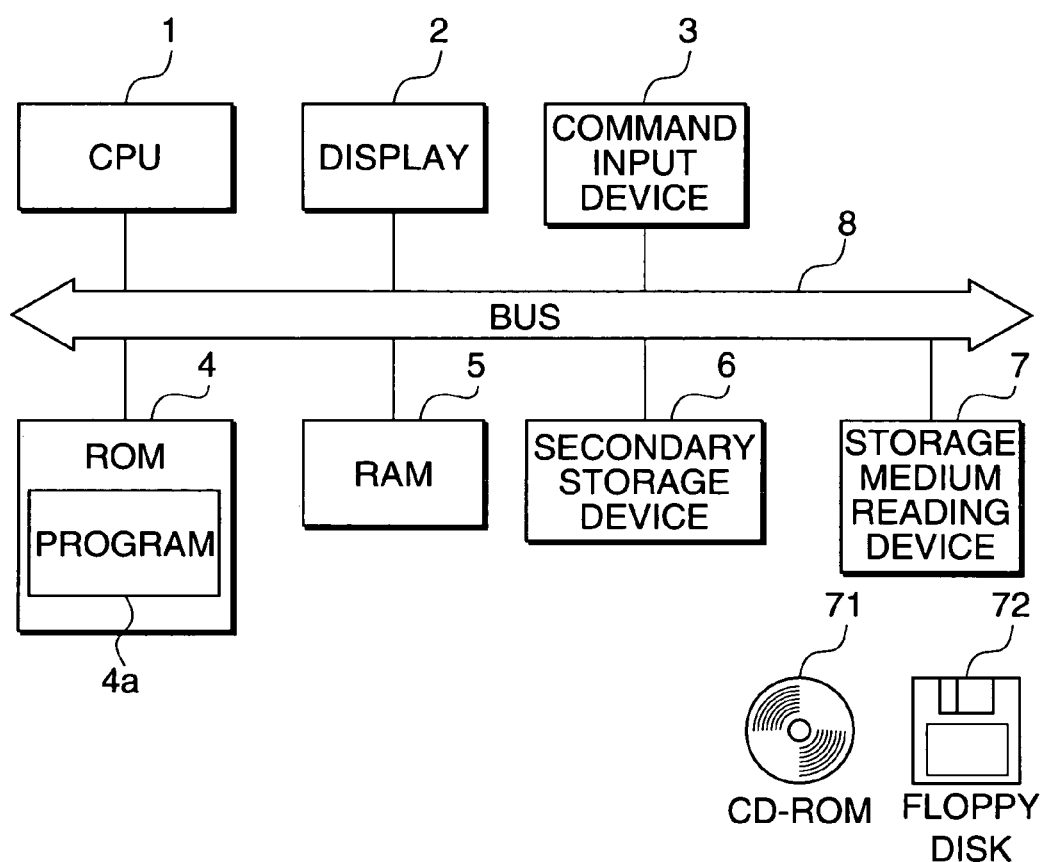
FIG. 1 is a schematic block diagram showing the structure of an image search apparatus according to first and second embodiments of the present invention.

FIG. 1 is a schematic block diagram showing the structure of an image search apparatus according to a first embodiment of the present invention. The image search apparatus of the first embodiment is comprised of a CPU 1, a display 2, a command input device 3, a ROM 4, a RAM 5, a secondary storage device 6, and a storage medium reading device 7. The structure in FIG. 1 is only an example, and the present invention is not limited to this particular example.

The CPU 1 controls the whole image search apparatus of the present embodiment. The CPU 1 is connected to the display 2, the command input device 3, the ROM 4, the RAM 5, the secondary storage device 6, and the storage medium reading device 7 through a bus 8 so that data can be transmitted between the CPU 1 and the devices connected thereto. The CPU 1 executes the processing illustrated in the flow charts of FIGS. 2 and 3 (the first embodiment) and FIGS. 8 and 9 (the second embodiment), which will be described later. The display 2 is comprised of a CRT, a liquid crystal or the like, and displays images, searched results, and a keyword input column. The command input device 3 is comprised of a keyboard, and a mouse or the like, and is used to input instructions about a variety of processing operations, movement of a focused point, selecting an item, inputting characters and marks, and the like. The ROM 4 is a read only memory that contains a variety of processing programs to be executed by the CPU 1. A program storage part 4a, which is a part of the ROM 4, contains a keyword search program (control program) and data according to the present invention.

The RAM 5 is a read and write enable memory that temporarily contains the results of various operations and inputted information. The secondary storage device 6 is comprised of a hard disk, an MO (Magneto Optic Disk), or the like. The secondary storage device 6 contains images, keywords and importance information assigned to the images, and image data (the first embodiment), images, keywords and importance information assigned to the images, a table used to search for search terms by development of the search terms into synonyms therefor, and image data (the second embodiment), and the like. The storage medium reading device 7 is comprised of a CD-ROM drive, an FD (floppy disk), or the like, and is used to read programs from storage mediums (i.e., a CD-ROM 71 and a floppy disk 72) that contain a program code means. The program of the present invention is stored in storage mediums such as an FD, a CD-ROM, a ROM, and a magnetic tape. The program may be read from the storage medium reading device 7 and be stored in the RAM 5.

FIGS. 4 and 5 show a part of an image management information table stored in the secondary storage device 6 of the image search apparatus according to the first embodiment of the present invention. FIG. 4 shows an image information table wherein each image is provided with an image ID as an image identification number in correspondence with each image file name. FIG. 5 shows a keyword table as a correspondence table of image IDs and keywords. The keyword table is provided with importance fields, and the importance field of each record contains the importance "1" through "3." The importance is predetermined so that a keyword representing an object forming a subject of an image can be of much importance, and that an unimportant keyword such as a keyword representing a minor object, which does not form a subject of an image, can be of little importance. In the case where there is already a large amount of data in the database and it is expensive to newly assign the importance, no data may be stored in the importance fields. The above-mentioned range and possible values of the importance are only one example of the present embodiment.

Figure 17:
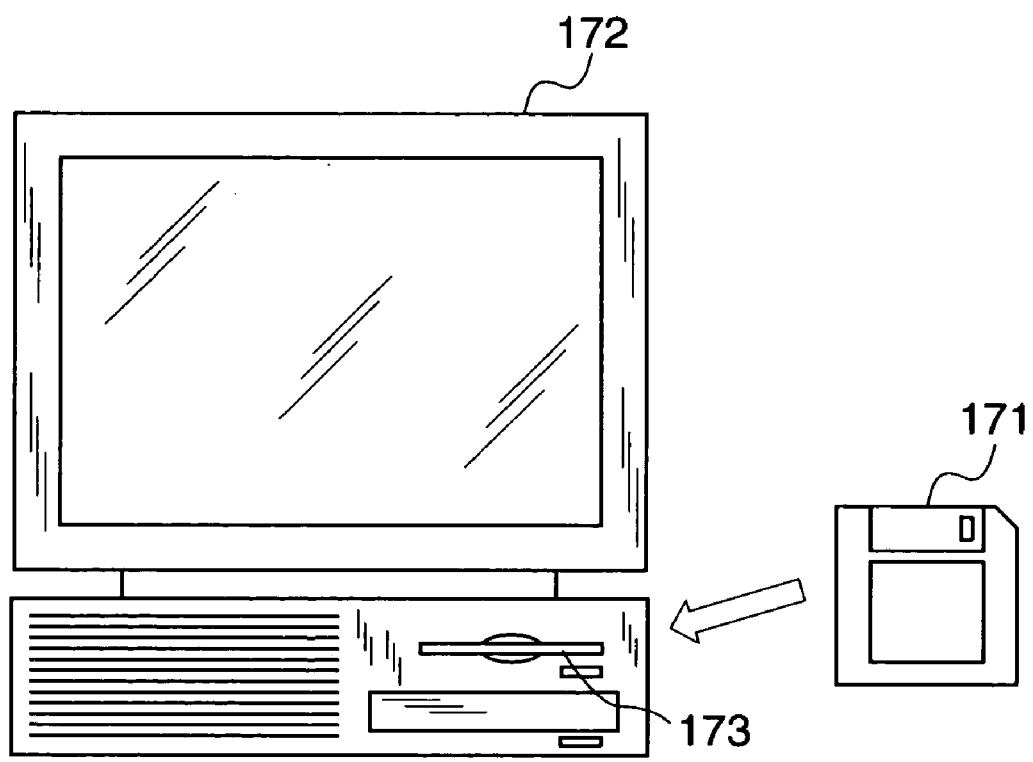
FIG. 17 is a view describing a manner that the programs and the related data for executing the image search method of the present invention are supplied from the storage medium to the apparatus.

FIG. 17 is a view describing how programs and related data for executing the image search method of the present invention are supplied from the storage medium to a device.

The programs and the related data for executing the image search method of the present invention are supplied to a device 172 by inserting a storage medium 171 such as a floppy disk and a CD-ROM into a storage medium drive insertion opening 172 formed in the device 172. Then, the program and the related data are installed onto a hard disk from the storage medium 171, and they are loaded into the RAM from the hard disk. Alternatively, the program and the related data are directly loaded into the RAM without being installed on the hard disk. This enables the execution of the program and the related data.

To execute a program for executing the image search method of the present invention by the image search apparatus according to the first embodiment or the later-described second embodiment of the present invention, the program and the related data are supplied to the image search apparatus in the procedure described with reference to FIG. 17, or the program and the related data are stored in the image search apparatus in advance. This enables the execution of the program.

Figures 15, 16:
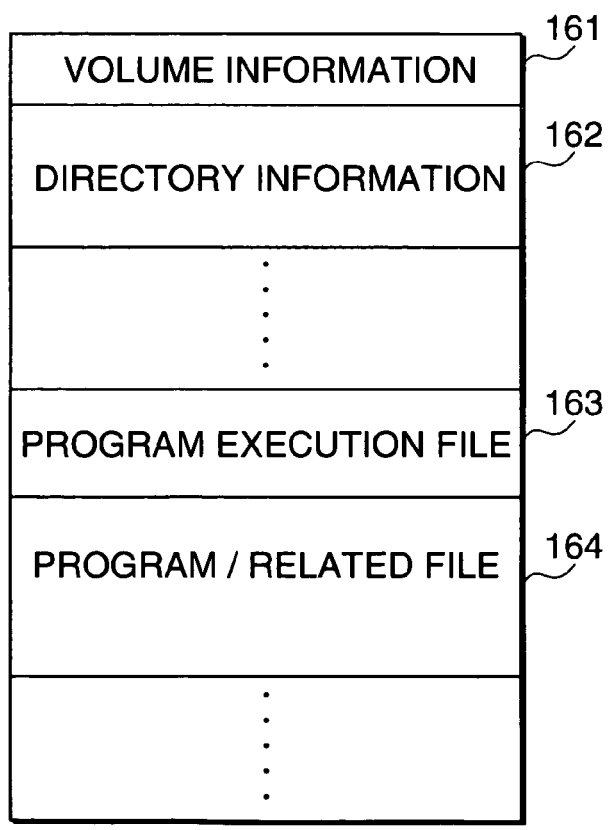
FIG. 15 is a view of data on results of processing according to the procedure of FIG. 9.
FIG. 16 is a view showing the storage contents of a storage medium that contains programs and related data for executing an image search method of the present invention.

FIG. 16 is a view showing an example of the structure of storage contents of a storage medium that contains the program and the related data for executing the image search method of the present invention. The storage medium of the present invention contains, for example, volume information 161, directory information 162, a program execution file 163, and a program/related data file 164. The program for executing the image search method of the present invention is coded according to the flow charts of FIGS. 2 and 3 (the first embodiment) or the flow charts of FIGS. 8 and 9 (the second embodiment).

Referring next to the flow charts of FIGS. 2 and 3 and FIGS. 5 through 7, a detailed description will be given of a control process of the image search apparatus according to the present invention that is constructed in the above-mentioned manner. The CPU 1 executes this control process.

Figure 2:
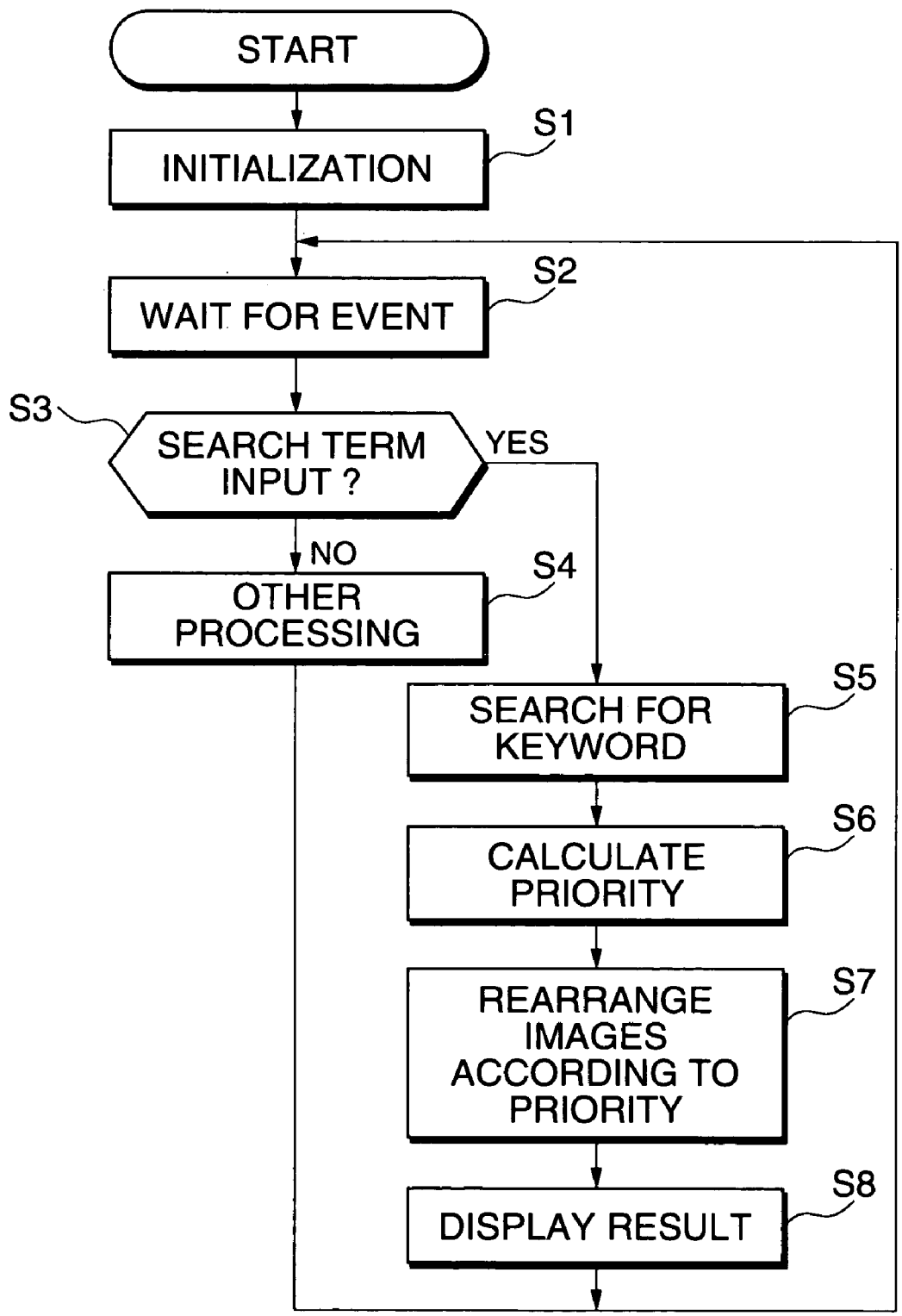
FIG. 2 is a flow chart showing the procedure of a control program stored in a ROM of the image search apparatus in FIG. 1 according to the first embodiment of the present invention.

FIG. 2 is the flow chart showing the procedure of a control program stored in the program storage part 4*a* of the ROM 4 of the image search apparatus. Turning on a power supply of the system starts the execution of a step S1 to perform a necessary initialization process. The occurrence of an event is waited for in a step S2. When an event for executing a command occurs due to an operation of the command input device 3, the process goes to a step S3. If the event is an image searching event, the process goes to a step S5. If the event is not the image searching event, the process goes to a step S4 to process the event. In the step S5, the keyword table in FIG. 5 is searched in a query language according to searching conditions to thereby extract relevant records. FIG. 6 shows an example of the extracted records. Then, the process goes to a step S6 to determine the priority.

Figure 3:
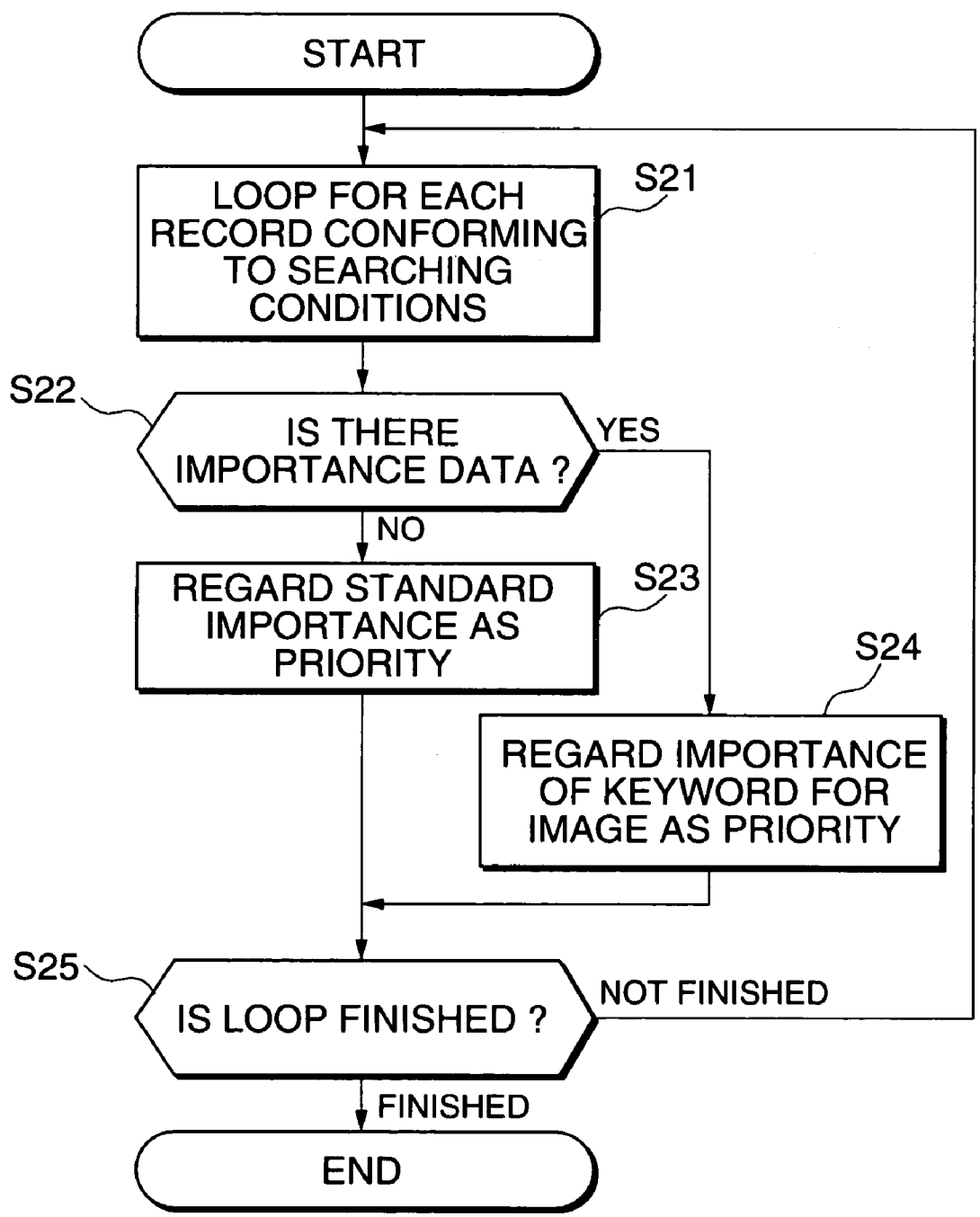
FIG. 3 is a flow chart showing the procedure of the control program stored in the ROM.

FIG. 3 is the flow chart showing the details of a priority calculating process in the step S6 in FIG. 2. In a step S21, a loop is started for the records extracted in the step S5. In a step S22, the importance field of each record is evaluated. If there is no importance data, the process goes to a step S23, and if there is the importance data, the process goes to a step S24. In the step S23, a standard importance is regarded as the priority. The standard importance is a default value of the importance, which is used if the importance has not yet been specified. In the present embodiment, "2" is regarded as the standard importance. In the step S24, the preset importance of the keywords for the images in the table in FIG. 5 is regarded as the priority. After the priority has thus been determined, the process goes to a step S25 to determine whether the processing of the last record has been completed or not. If the processing of the last record has been completed, the priority calculating process is finished. After the priority is calculated in the above-mentioned manner, the process goes to a step S7 to rearrange the images according to the priority. FIG. 7 shows an example of the rearranged records. Then, the process goes to a step S8 to output the images through the display 2.

As stated above, the image search apparatus according to the first embodiment of the present invention has the secondary storage device 6, which contains the keywords assigned to the image data correspondingly to the importance, and the CPU 1, which searches the secondary storage device 6 for keywords corresponding to images to be searched according to an inputted search term and controls the apparatus in such a manner as to rearrange the searched images according to the importance. Therefore, the operation and effect of the image search apparatus according to the first embodiment of the present invention are as described hereinbelow.

In this arrangement, the importance field of each record conforming to the searching conditions is evaluated, and if there is no importance data, the standard importance of a default is regarded as the priority. On the other hand, if there is importance data, the predetermined importance of a keyword corresponding to the image is regarded as the priority. After the priority of every image is found, the images are rearranged according to the priority and the rearranged images are outputted. More specifically, keywords representing objects forming subjects of images are determined to have much importance, and unimportant keywords representing minor objects in images, which do not form subjects of the images, are determined to have little importance. The images are stored together with the keywords for which the importance has been determined as mentioned above. Therefore, the images to which the keywords matching the inputted search term are rearranged according to the importance. This makes it easy for the user to quickly reach a desired image.

There will now be described an image search apparatus according to a second embodiment of the present invention.

As shown in FIG. 1, the image search apparatus of the second embodiment is comprised of the CPU 1, the display 2, the command input device 3, the ROM 4, the RAM 5, the secondary storage device 6, and the storage medium reading device 7 as is the case with the first embodiment. Each part of the image search apparatus has the same structure as in the first embodiment, and therefore, it will not be described hereinbelow.

FIGS. 10 through 12 are views showing a part of an image management information table stored in the secondary storage device 6 of the image search apparatus according to the second embodiment. FIG. 10 shows an image information table wherein an image ID as an image identification number is assigned to each image corresponding to each image file name. FIG. 11 shows a keyword table wherein image IDs and keywords are arranged correspondingly to one another. This table has importance fields, and the importance from "1" through "3", which is set according to the same standard as that of the first embodiment, is stored in the importance field of each record. If there is already a large amount of data in the database and it is expensive to newly assign the importance, no data is stored in this importance fields. FIG. 12 shows a synonym-search term table wherein words having nearly the same meaning as an inputted search term are stored as synonyms. This synonym-search term table has accordance fields, and the accordance "0" through "1" indicating the conceptual distance between the search term and the synonyms (the accordance "1" indicates the same concept) is stored in the accordance field of each record. The range of the importance and the accordance is only an example of the present embodiment, and the present invention is not limited to this. The accordance can be determined in a variety of methods such as a manual method and an automatic generating method using electronic dictionary data or the like.

Referring next to the flow charts of FIGS. 8 and 9 and FIGS. 11 through FIG. 15, a detailed description will be given of the control process of the image search apparatus according to the second embodiment that is constructed in the above-mentioned manner. The CPU 1 executes this control process.

Figure 8:
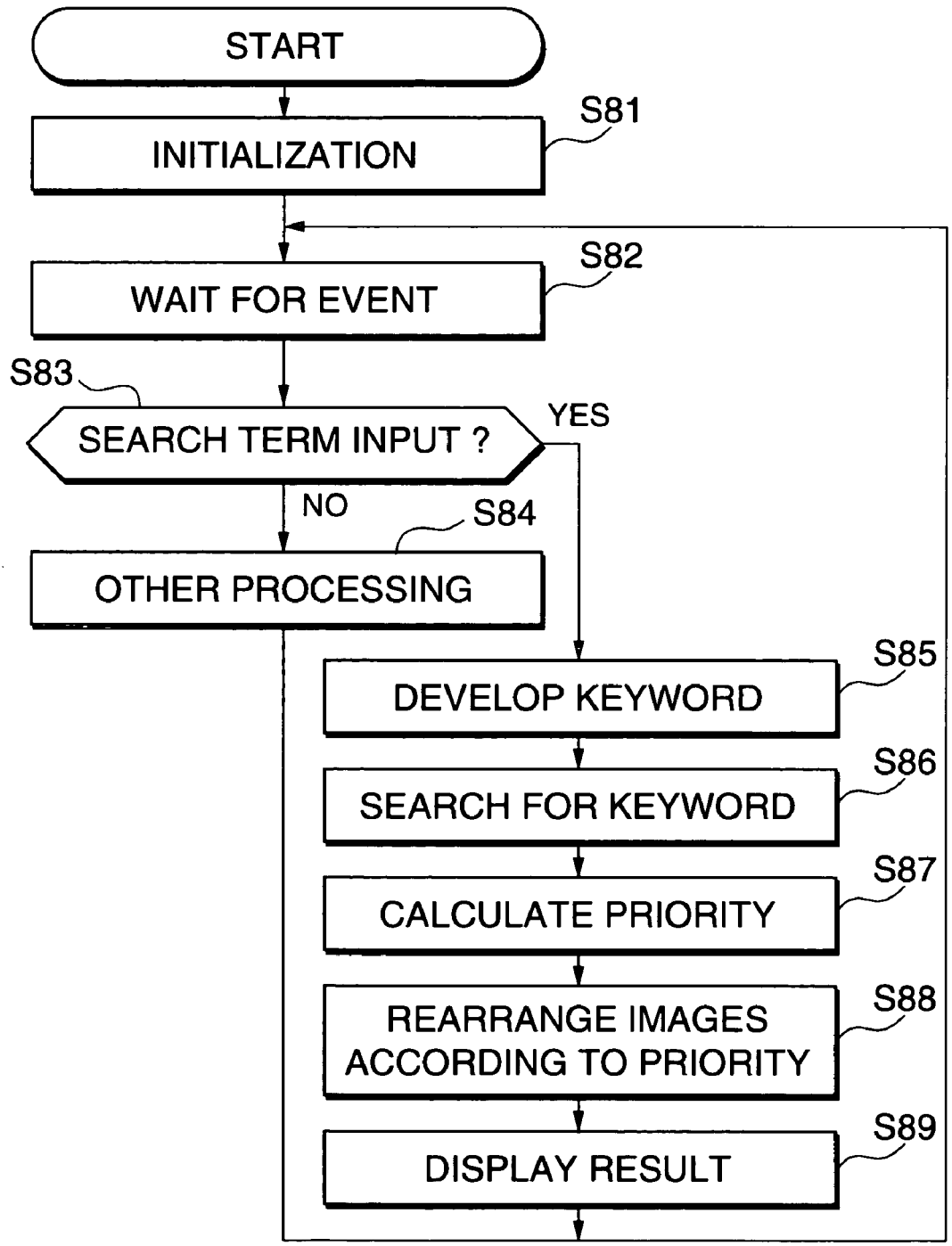
FIG. 8 is a flow chart showing the procedure of a control program stored in the ROM of the image search apparatus in FIG. 1 according to the second embodiment of the present invention.

FIG. 8 is the flow chart showing the procedure of a control program stored in the program storage part 4a of the ROM 4 in the image search apparatus. When the power supply of the system is turned on, a step S81 is executed to perform a necessary initialization. The occurrence of an event is waited for in a step S82. When an event for executing a command occurs due to an operation through the command input device, the process goes to a step S82. If the event is an image searching event, the process goes to a step S85. If the event is not the image searching event, the process goes to a step S84 to process the event. In the step S85, an inputted search term is developed into synonyms with reference to a synonym-keyword development table (FIG. 12) to find the accordance. For example, if a search term "motorbike" is developed, a synonym "motorcycle" is searched out and the accordance is 0.6. If a search term "motorcycle" is inputted, the accordance is 1 since the search term "motorcycle" accords with the synonym "motorcycle". Then, the process goes to a step S86 to search the keyword table in FIG. 11 by the words developed in the table of FIG. 12 and extract relevant records. FIG. 13 shows an example of the extracted records. Then, the process goes to a step S87 to calculate the priority.

Figure 9:
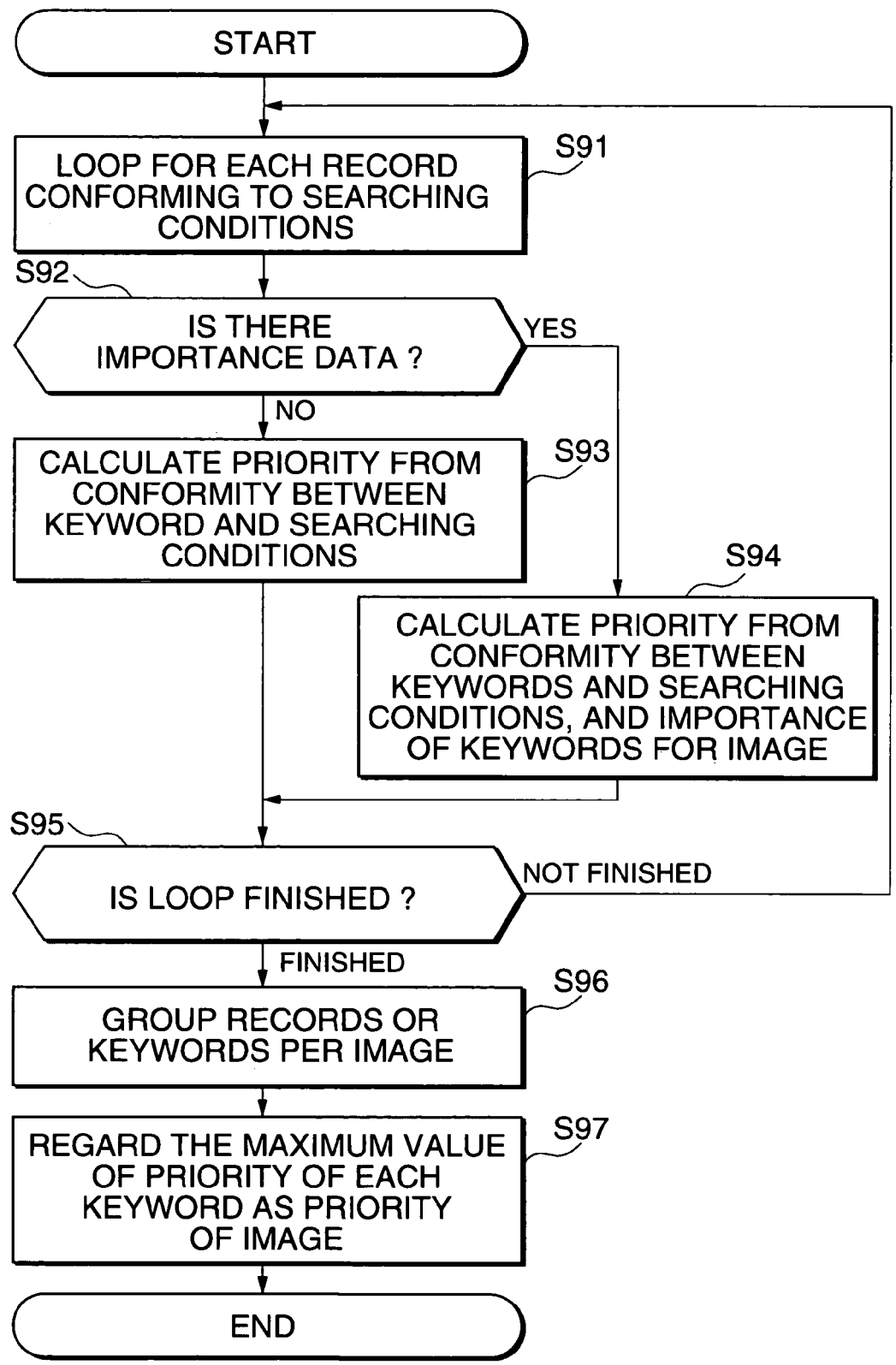
FIG. 9 is a flow chart showing the procedure of the control program stored in the ROM.

FIG. 9 is the flow chart showing the details of the priority calculating process in the step S87 of FIG. 8. In a step S91, a loop is started for each record extracted in the step S86. In a step S92, the importance field of each extracted record is evaluated. If there is no importance data, the process goes to a step S93, and if there is importance data, the process goes to a step S94. In the step S93, the priority is calculated according to a priority formula matrix with reference to a column of the relevant accordance in a line with no importance. In the step S94, the priority is calculated according to the priority formula matrix with reference to a column of the relevant accordance in a line with the relevant importance. FIG. 14 shows an example of the priority formula matrix. If the accordance found in the step S85 is not less than the accordance of a predetermined threshold level (0.5), the importance plus the accordance is regarded as the priority. If the accordance found in the step S85 is less than the threshold level, the accordance is regarded as the priority. The formula of the priority, the formula of the priority formula matrix and the fineness of segmentation are determined according to the range distribution of the importance and the accordance.

After the calculation of the priority as described above, the process goes to a step S95 to determine whether the process with respect to the last record is completed or not. If completed, the process goes to a step S96, and if not completed, the process returns to the step S91. The keywords are grouped per image in the step S96. If a plurality of keywords correspond to one image in a step S97, the maximum value of the priority found in the step S93 or S94 is regarded as the priority of the image. FIG. 15 shows a search result with respect to a plurality of records corresponding to the same image. After the priority is found for each image as described above, the process goes to a step S88 in FIG. 8 to rearrange the images according to the priority. Then, the process goes to a step S89 to output the search result through the display 2.

As stated above, the image search apparatus according to the second embodiment has the secondary storage device 6 that contains the keywords assigned to the image data correspondingly to the importance, and the CPU 1 that controls the apparatus in such a manner as to search the secondary storage device 6 for keywords corresponding to an inputted search term and keywords having the same or a close meaning as or to the search term and rearrange images, to which the searched keywords are assigned, according to the importance and the closeness in meaning. Therefore, the operation and effect of the image search apparatus according to the second embodiment are as described hereinbelow.

In this arrangement, the importance field of each record conforming to the searching conditions is evaluated, and if there is no importance data, the priority is calculated according to the priority formula matrix with reference to a relevant column of accordance in a line with no importance. On the other hand, if there is importance data, the priority is calculated according to the priority formula matrix with reference to a relevant column of accordance in a line with relevant importance. After the priority of every image is found, the images are rearranged according to the priority and the rearranged images are outputted. More specifically, keywords representing objects forming subjects of images are determined to have much importance, and unimportant keywords representing minor objects in images, which do not form subjects of the images, are determined to have little importance. The accordance (the closeness in meaning) is determined according to the similarity of a keyword, which matches an inputted search term, with respect to the search term. The images are stored together with the keywords for which the importance and the accordance have been determined as mentioned above. Therefore, the images to which the keywords matching the inputted search term are rearranged according to the importance and the accordance. This makes it easy for the user to quickly reach a desired image.

In the first and second embodiments of the present invention described above, the present invention is applied to the simplex image search apparatus; however, the present invention is not limited to this. For example, the present invention may also be applied to a system wherein an image search apparatus connects to external devices (e.g., a computer and a printer) through a network such as the Internet and a LAN (Local Area Network).

In the first and second embodiments of the present invention described above, the search result is outputted through the display 2 of the image search apparatus; however, the present invention is not limited to this. For example, the image search apparatus may be connected to a printer that outputs the search result.

In the first and second embodiments of the present invention described above, the keyword tables in FIGS. 5 and 11 are given as examples; however, the present invention is not limited to the keywords and the importance shown in FIGS. 5 and 11. The keywords and the importance may be determined arbitrarily.

The present invention may be applied to either a system comprised of plural equipment or an apparatus comprised of single equipment. For example, the image search apparatus of the present invention may be provided on a server of an information retrieval system such as a WWW (World Wide Web) on the Internet. Then, a search term inputted from a WWW browser of a client is issued through the WWW, and the image search apparatus of the present invention provided on the WWW server receives the search term to search and rearrange images. The search result is shaped in the HTML (Hyper Text Markup Language) or the XML (Extensible Markup Language), and is then returned to the client.

Moreover, it is needless to say that the present invention can also be achieved by supplying a program to the system or the apparatus. It is needless to say that the present invention can also be achieved by providing the system or the apparatus with a storage medium containing a program code of software realizing the functions of the above described embodiments, and reading a program code from the storage medium by a computer (or a CPU and an MPU) of the system or the apparatus. In this case, the program according to the present invention, in other words, the program code read from the storage medium executes the functions of the above described embodiments. The storage medium containing the program code constitutes the present invention.

The storage medium for providing the program code is, for example, a floppy disk, a hard disk, an optical disk, a magneto optic disk, a CD-ROM, a CD-R, a magnetic tape, a non-volatile memory card, and a ROM.

Moreover, it is needless to say that the functions of the above described embodiments can be realized not only by executing the program code read from the computer, but also by executing a part or the whole of the actual processing by means of an OS or the like operating on the computer.

Furthermore, it is also needless to say that the functions of the above described embodiments can be realized in such a manner that the program code read from the storage medium is written in a memory provided in a function expanding board inserted into the computer or a function expanding unit connected to a computer, and then a CPU or the like provided in the function expanding board or the function expanding unit executes a part or the whole of the actual processing according to instructions of the program code.

What is claimed is:

1. An image search apparatus comprising:
   referring means for referring to a keyword table in a memory,
   wherein the keyword table includes a plurality of keywords associated with a plurality of different images,
   wherein at least one of the plurality of different images is associated with at least two of the keywords having different levels of importance with respect to the one image,
   wherein at least one of the at least two keywords associated with the one image also is associated with at least another of the plurality of different images, and
   wherein the one keyword has a plurality of levels of importance so that the one keyword has one level of importance associated with the one image and another level of importance associated with the another image;
   search means for searching said plurality of different images according to an input search query related to the one keyword;
   acquiring means for acquiring said plurality of levels of importance of the one keyword based on the images searched by said search means; and
   output means for outputting said plurality of images searched by said search means in an order according to said plurality of levels of importance of the one keyword acquired by said acquiring means.

2. An image search apparatus according to claim 1, wherein said output means outputs said plurality of images according to a standard level of importance of a default when said plurality of levels of importance are not stored in relation to a keyword of said plurality of keywords.

3. An image search apparatus according to claim 1, wherein said acquiring means acquires a level of accordance between at least one synonym of a keyword of said plurality of keywords and said input search query and said output means outputs said plurality of images searched by said search means in an order according to said plurality of levels of importance of the keyword acquired by said acquiring means and said level of accordance acquired by said acquiring means.

4. An image search apparatus according to claim 1, wherein said image search apparatus is provided in a server of an information retrieval system on the Internet, an input means receiving a search query inputted from a WWW browser of a client of said information retrieval system on the Internet, said output means outputting said plurality of images searched by said search means in a predetermined format, which includes HTML and XML, to said client in said order.

5. An image search method applied to an image search apparatus comprising:
   a referring step of referring to a keyword table in a memory,
   wherein the keyword table includes a plurality of keywords associated with a plurality of different images,
   wherein at least one of the plurality of different images is associated with at least two of the keywords having different levels of importance with respect to the one image,
   wherein at least one of the at least two keywords associated with the one image also is associated with at least another of the plurality of different images, and
   wherein the one keyword has a plurality of levels of importance so that the one keyword has one level of importance associated with the one image and another level of importance associated with the another image;
   a searching step of searching said plurality of different images according to an input search query related to the one keyword;
   an acquiring step of acquiring said plurality of levels of importance of the one keyword based on the images searched by said searching step; and
   an output step of outputting said plurality of images searched by said searching step in an order according to said plurality of levels of importance of the one keyword acquired by said acquiring step.

6. An image search method according to claim 5, wherein said plurality of images are output according to a standard level of importance of a default when said plurality of levels of importance are not stored in relation to a keyword of said plurality of keywords.

7. An image search method according to claim 5, wherein a level of accordance between at least one synonym of a keyword of said plurality of keywords and said input search query is acquired and said plurality of images are output, said plurality of images searched by said searching step in an order according to said plurality of levels of importance of the keyword acquired by said acquiring step and said level of accordance acquired by said acquiring step.

8. An image search method according to claim 5, wherein an input step comprises receiving a search query inputted from a WWW browser of a client of an information retrieval system on the Internet, said output step outputting said plurality of images searched by said searching step in a predetermined format, which includes HTML and XML, to said client in said order.

9. A storage medium readable by a computer and stores a program for executing an image search applied to an image search apparatus, the program comprising instructions for:
referring to a keyword table in a memory,
wherein the keyword table includes a plurality of keywords associated with a plurality of different images,
wherein at least one of the plurality of different images is associated with at least two of the keywords having different levels of importance with respect to the one image,
wherein at least one of the at least two keywords associated with the one image also is associated with at least another of the plurality of different images, and
wherein the one keyword has a plurality of levels of importance so that the one keyword has one level of importance associated with the one image and another level of importance associated with the another image;
searching said plurality of different images according to an input search query related to the one keyword;
acquiring said plurality of levels of importance of the one keyword based on the images searched by said searching instruction; and
outputting said plurality of images searched by said searching instruction in an order according to said plurality of levels of importance of the one keyword acquired by said acquiring instruction.

10. A storage medium according to claim 9, wherein said plurality of image data images are output according to a standard level of importance of a default when said plurality of levels of importance are not stored in relation to a keyword of said plurality of keywords.

11. A storage medium according to claim 9, wherein a level of accordance between at least one synonym of a keyword of said plurality of keywords and said input search query is acquired and said plurality of images are output, said plurality of images searched by said searching instruction in an order according to said plurality of levels of importance of the keyword and said level of accordance.

12. A storage medium according to claim 9, wherein an input instruction comprises receiving a search query inputted from a WWW browser of a client of an information retrieval system on the Internet, said output instruction outputting said plurality of images searched by said searching instruction in a predetermined format, which includes HTML and XML, to said client in said order.

13. A contents search apparatus comprising:
referring means for referring to a keyword table in a memory,
wherein the keyword table includes a plurality of keywords associated with a plurality of different contents,
wherein at least one of the plurality of different contents is associated with at least two of the keywords having different levels of importance with respect to the one content,
wherein at least one of the at least two keywords associated with the one content also is associated with at least another of the plurality of different contents, and
wherein the one keyword has a plurality of levels of importance so that the one keyword has one level of importance associated with the one content and another level of importance associated with the another content;
search means for searching said plurality of different contents according to an input search query related to the one keyword;
acquiring means for acquiring said plurality of levels of importance of the one keyword based on the contents searched by said search means; and
output means for outputting said plurality of contents searched by said search means in an order according to said plurality of levels of importance of the one keyword acquired by said acquiring means.

14. A computer-implemented contents search method applied to a contents search apparatus, the method comprising:
a referring step of referring to a keyword table in a memory,
wherein the keyword table includes a plurality of keywords associated with a plurality of different contents,
wherein at least one of the plurality of different contents is associated with at least two of the keywords having different levels of importance with respect to the one content,
wherein at least one of the at least two keywords associated with the one content also is associated with at least another of the plurality of different contents, and
wherein the one keyword has a plurality of levels of importance so that the one keyword has one level of importance associated with the one content and another level of importance associated with the another content;
a searching step of searching said plurality of different contents according to an input search query related to the one keyword;
an acquiring step of acquiring said plurality of levels of importance of the one keyword based on the contents searched by said searching step; and
an output step of outputting said plurality of contents searched by said searching step in an order according to said plurality of levels of importance of the one keyword acquired by said acquiring step.

15. A storage medium readable by a computer and stores a program for executing a contents search applied to a contents search apparatus, the program comprising instructions for:
referring to a keyword table in a memory,
wherein the keyword table includes a plurality of keywords associated with a plurality of different contents,
wherein at least one of the plurality of different contents is associated with at least two of the keywords having different levels of importance with respect to the one content,
wherein at least one of the at least two keywords associated with the one content also is associated with at least another of the plurality of different contents, and
wherein the one keyword has a plurality of levels of importance so that the one keyword has one level of importance associated with the one content and another level of importance associated with the another content;
searching said plurality of different contents according to an input search query related to the one keyword;
acquiring said plurality of levels of importance of the one keyword based on the contents searched by said searching instruction; and
outputting said plurality of contents searched by said searching instruction in an order according to said plurality of levels of importance of the one keyword acquired by said acquiring instruction.

16. An image search apparatus comprising:
referring device that refers to a keyword table in a memory,
wherein the keyword table includes a plurality of keywords associated with a plurality of different images, wherein at least one of the plurality of different images is associated with at least two of the keywords having different levels of importance with respect to the one image, wherein at least one of the at least two keywords associated with the one image also is associated with at least another of the plurality of different images, and wherein the one keyword has a plurality of levels of importance so that the one keyword has one level of importance associated with the one image and another level of importance associated with the another image;

search device that searches said plurality of different images according to an input search query related to the one keyword;

acquiring device that acquires said plurality of levels of importance of the one keyword based on the images searched by said search device; and output device that outputs said plurality of images searched by said search device in an order according to said plurality of levels of importance of the one keyword acquired by said acquiring device.

* * * * *